I. A. LAKE.
PNEUMATIC CUSHION.
APPLICATION FILED JUNE 24, 1915.
1,163,419.
Patented Dec. 7, 1915.
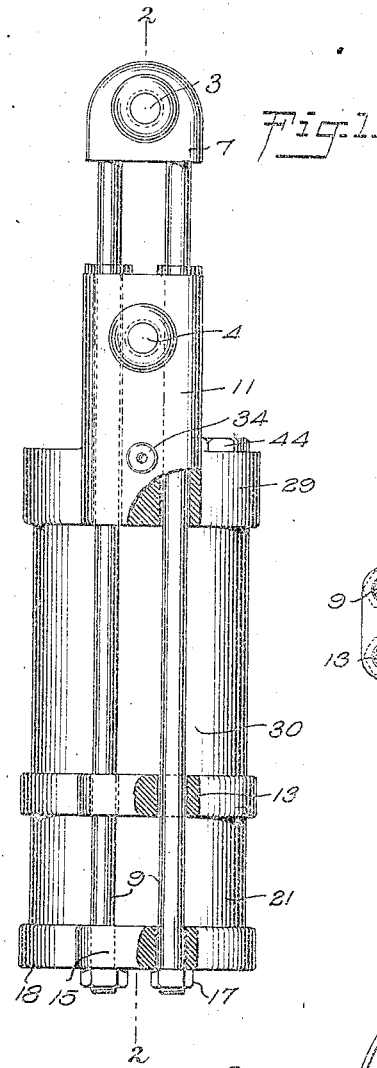
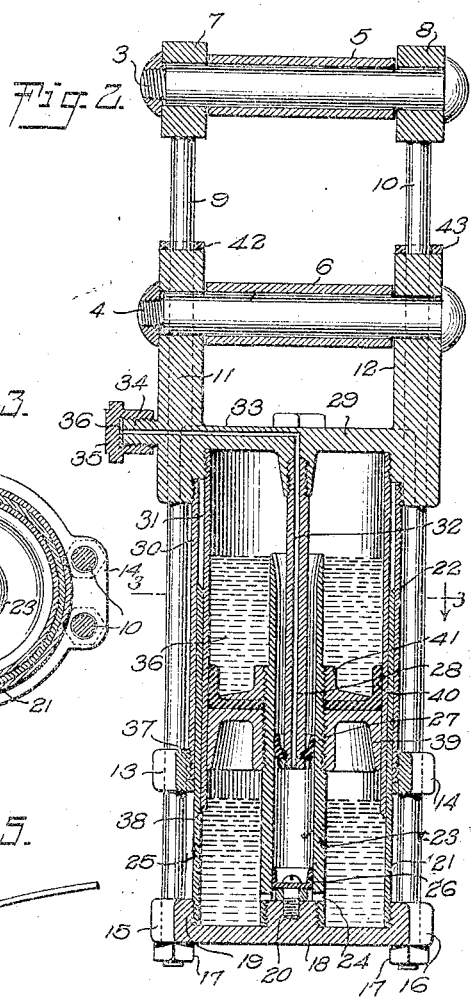
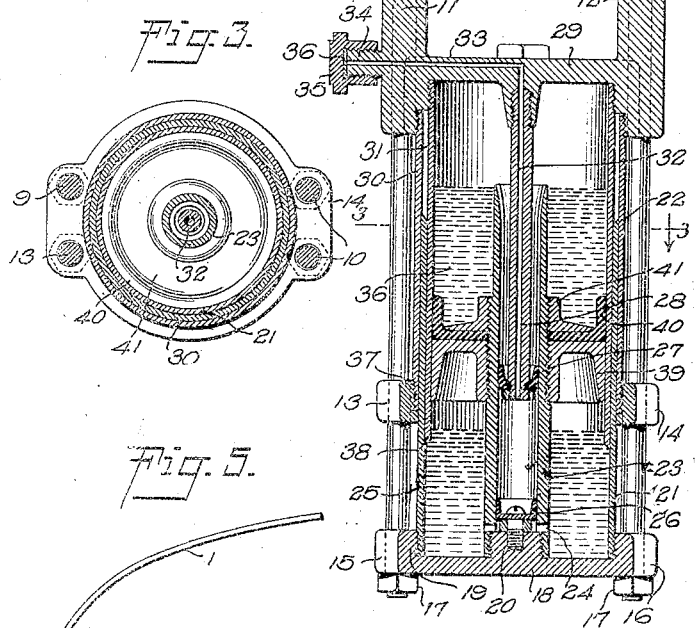
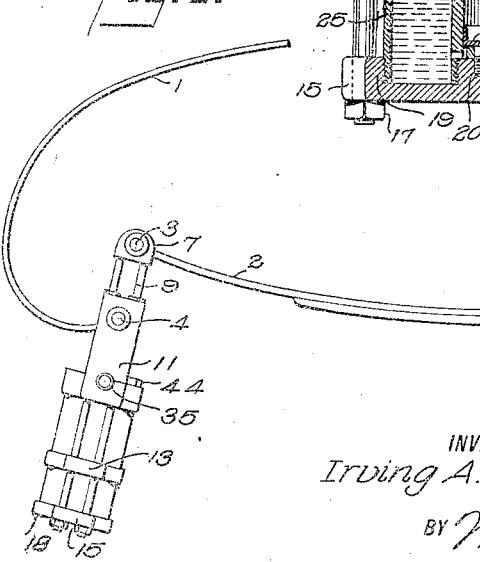
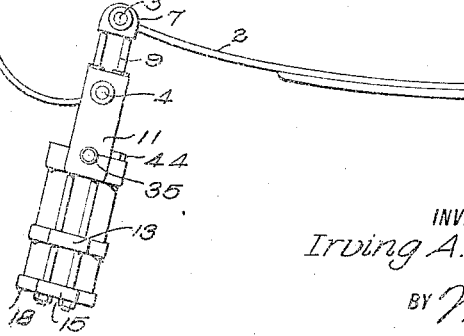
WITNESSES:
William P. Goebel.
A. L. Kitchin.
INVENTOR
Irving A. Lake
BY Munn & Co.
ATTORNEY

UNITED STATES PATENT OFFICE.

IRVING A. LAKE, OF NEW YORK, N. Y., ASSIGNOR OF ONE-HALF TO EMILY LAKE, OF NEW YORK, N. Y.

PNEUMATIC CUSHION.

1,163,419.  Specification of Letters Patent.  Patented Dec. 7, 1915.

Application filed June 24, 1915. Serial No. 36,104.

*To all whom it may concern:*

Be it known that I, IRVING A. LAKE, a citizen of the United States, and a resident of the city of New York, borough of the Bronx, in the county of Bronx and State of New York, have invented a new and Improved Pneumatic Cushion, of which the following is a full, clear, and exact description.

This invention relates to cushioning devices and particularly to what are sometimes called shock absorbers for vehicles, and has for an object the provision of an improved cushion construction that utilizes air as the cushion medium.

Another object in view is to provide an improved cushioning device with telescoping members for utilizing the cushioning effect of compressed air and applying the same to the springs of a vehicle.

A still further object in view is to provide a cushioning device with a pair of telescoping tubular sections and a combined pump and valve structure for controlling the flow of air and liquid used in the telescoping sections so as to produce the desired cushioning effect.

In the accompanying drawings: Figure 1 is a side view of a pneumatic cushioning device embodying the invention; Fig. 2 is a section through Fig. 1 approximately on line 2—2; Fig. 3 is a section through Fig. 2 on line 3—3; Fig. 4 is a detail fragmentary sectional view through the upper part of one of the telescoping sections shown in Fig. 2 illustrating an intake plug; Fig. 5 is a fragmentary side view of the springs of an automobile with an embodiment of the invention applied thereto.

Referring to the accompanying drawings by numerals, 1 indicates the usual top spring of an automobile and 2 the bottom spring, the same forming no part of the present invention but being the means to which the cushioning device embodying the invention is shown attached. Spring 2 is provided with a suitable eye which surrounds the pin or bolt 3 while pin 4 extends through a suitable eye arranged on spring 1. In order to reduce the friction to a minimum, rollers 5 and 6 are mounted on the pins or bolts 3 and 4. The pin 3 extends through head members 7 and 8, which head members have rigidly secured thereto rods 9 and rods 10, which rods extend downwardly and through the upstanding lugs 11 and 12 and also through the lugs 13, 14, 15 and 16, respectively. The lower end of each of the rods 9 and 10 are provided with some form of retaining means, as for instance, nuts 17. The projections or lugs 11 and 12 and 13 and 14 act as guides for the moving parts of the device and as means for holding the moving parts connected with the various rods 9 and 10.

The lugs 15 and 16 are projections from a base 18 which is provided with a threaded portion 19 and a threaded extension 20. The threaded portion 19 has screwed thereon a tubular member 21, which tubular member may be of any desired length and which is preferably formed with a beveled upper edge 22, as clearly shown in Fig. 2. The threaded extension 20 has a tubular member 23 threaded thereover, said tubular member being provided with a plurality of openings 24 whereby the oil or other fluid 25 in the tubular member or chamber 21 may freely enter the tubular member 23. However, this entrance is retarded by a washer of leather or other suitable material 26 which is connected with projection 20 by a suitable thread, the same being spaced from the projection 20 by a spacing member. By this construction and arrangement whenever there is an excessive pressure on the fluid 25 the same may enter the openings 24 and force itself past the washer 26 into the body of the tubular member 23 and finally out of the upper end of the tube 23.

Arranged in tube 23 above washer 26 is a washer 27 which is connected with a plunger 28. Plunger 28 is rigidly secured to the top 29, which top has threaded thereon the tubular casings 30 and 31. The plunger 28 is provided with a bore 32 registering with a bore 33. Bore 33 extends to an inlet member 34 which inlet member is adapted to normally be provided with a cap 35 having a suitable washer 36. When it is desired to insert air into the device, cap 35 is removed and a pump is substituted. The air passes through passageway 33 and also through passageway 32 into the tubular member 23 below washer 27. Washer 26 will prevent the air from passing through apertures 24 but washer 27 will allow the air to pass upwardly and be discharged out the upper end of the tubular member or pipe 23, thus providing a supply of compressed air in the upper part of the casing 31, said air being of course above the fluid 36, which fluid is preferably a good quality of oil.

The casings 30 and 31 fit on opposite sides of the casing or tubular member 21, as clearly shown in Figs. 2 and 3, casings 31 and 21 acting as telescoping members carrying compressed air and oil, while casing 30 acts as a guide and as a support for the ring 37 to which it is threaded, said ring carrying the lugs or projections 13 and 14. The lower end of the casing 31 is provided with a bevel 38 which acts similar to the beveled end 22 of the tubular member 21, said beveled construction in a certain sense shaving off the oil from the adjacent casing and thereby preventing the passage of any oil from the interior of the casings to a point exterior thereof.

A metallic guide 39 in the form of a washer is threaded on to the bifurcated tubular member 23 substantially midway of the length thereof, as shown in Fig. 2, and on this member is mounted a washer 40 of leather, rubber or other suitable material, said washer 40 being held in place by a suitable nut 41. It will be noted that an upward movement of washer 40 will cause the washer to hug the walls of casing 31 and thereby prevent the escape of any of the oil 36, thus compressing the air in the casing 31 above oil 36. When the washer 40 and associated parts move upwardly the bottom 18 will also move upwardly without, however, appreciably compressing the air below the washer 39, as the only restriction of the space below the washer 39 is the entrance of part of the casing 31. As the member 40 and associated parts move back and forth during the use of the device some of the oil 36 will pass along the surface of casing 31 downwardly into the casing or tubular member 21 so as to augment the oil 25. When the oil pressure above oil 25 becomes sufficiently great the same will force some of the oil 25 into the pipe or tubular member 23 and eventually past the washer 27 so that when a sufficient amount has been forced into the upper part of the tubular member 23 the same will discharge into the casing 31, thus maintaining a substantially even supply of oil in casing 31. The oil keeps all the parts well lubricated and causes the same to operate properly, while the air acts as a cushioning element. In addition to acting as a lubricant the oil acts as means for maintaining the air pressure substantially at all sides. If for any reason the air should leak out, or when it is desired to first charge the device with air, the air is forced in through passageways 31 and 32 into the pipe 25 below washer 27. This air will pass upwardly past washer 27 and will raise any oil thereon so as to discharge the same into casing 31, into which casing the air will eventually be discharged.

In operation the device is connected with the springs 1 and 2 of an automobile, as shown in Fig. 5, and when first connected the same is usually not supplied with air but a pump is connected with member 34 and air is forced into the casing 31 as above set forth. The air pressure in casing 31, of course, must be in proportion to the weight of the automobile and consequently the air is pumped into the casing 31 until the heads 7 and 8 separate from the lugs or projections 11 and 12, the separation being approximately that shown in the drawings though a greater or less separation may be provided if desired. As the automobile is used the heads 7 and 8 will approach the lugs or projections 11 and 12 and move therefrom according to the roughness of the road. Sometimes, in case of extra violent jarring of the automobile, the heads 7 and 8 may strike the projections 11 and 12. To cushion such an excessive blow, rubber or fibrous washers 42 and 43 may be supplied. Also, whenever desired, the plug 44 may be removed but when so removed the air in casing 31 will escape. The removal of this plug is usually not done unless additional oil is desired. The quantity of oil used may be varied as desired but a preferable proportion of the space to be occupied by the oil is shown in Fig. 2.

By the arrangement of the telescoping sections 21, 30 and 31 the parts frictionally engaging are automatically kept oiled by certain of the parts continually contacting with the oil 25 in the casing or tubular member 21. By using the oil 36 air is confined so that the resistance to the back and forth movement of rods 9 and 10 is caused by the resistance of air which produces a gradual increasing resistance and also a gradual decreasing resistance as the parts move back and forth. It is also to be noted that when the lower spring 2 moves downwardly, as for instance when the wheel of the automobile enters a depression, the rods 9 and 10 move downwardly with associated parts without resistance of anything except slight friction between the parts, the air pressure in casing 31 also in effect acting as an assistant for moving the rods 9 and 10 downwardly. Upon the return movement of the parts the air in casing 31 will resist a sudden return so that a jolt or jar is cushioned and distributed or lengthened an appreciable amount.

What I claim is:—

1. In an automatic cushioning device, a pair of telescoping casings, a division plate arranged interiorly of one of said casings, a tubular member for connecting said division plate to the other of said casings, said tubular member extending from the lower casing to near the upper end of the upper casing, said tubular member being formed with openings near the lower end, a washer arranged in said tubular member above said openings whereby fluid in said lower casing may pass into said tubular member but cannot pass from said tubular member into the lower casing, a piston rod extending from the upper end of the upper casing into said tubular member, a washer arranged on said piston rod facing in the same direction as the first mentioned washer, whereby the said washers, piston rod and tubular member will act as a pump for drawing fluid from the lower casing and forcing the same into the upper casing, and means for directing air into said tubular member, said air being adapted to pass by said second mentioned washer into the upper casing.

2. In an automatic cushioning device, an upper and a lower casing, said casing telescoping, a supply of oil arranged in both of said casings, a tubular member extending from the bottom of the lower casing into the upper casing, a bottom member connected to said tubular member intermediate the length thereof, said tubular member having apertures adjacent the bottom, an upwardly facing washer arranged in said tubular member above said apertures, a piston extending from the upper end of said upper casing into said tubular member, an upwardly facing washer connected to said piston whereby as the device is operated the upper washer will act as the piston of the pump and draw the oil from the lower casing and force the same into the upper casing, means for directing air into said upper casing, and means for connecting the device to the operating parts of an automobile.

3. In a pneumatic cushioning device of the character described, a bottom member, a top member, tubular telescoping members connected with said bottom member and said top member respectively, a piston connected with said bottom member and spaced therefrom, said piston including a tubular member extending from a point beyond said piston, a plurality of sliding bars connected with said bottom member, means for connecting said sliding bars with one spring of an automobile, and means for connecting said top member with another spring of the automobile.

4. In a pneumatic cushioning device of the character described, a bottom member, a tubular casing extending therefrom, a top member, a tubular casing extending from said top member and telescopically fitting said first mentioned tubular casing, a pipe extending upwardly from said bottom member, said pipe having an aperture adjacent the bottom, a washer arranged in said pipe adjacent said aperture for permitting matter to pass in one direction through said pipe, a second washer arranged in said pipe for permitting matter to move in one direction through said pipe, a piston structure connected with said pipe and arranged to compress the air in the tubular member extending from said top, means extending into said pipe and to a point below said second mentioned washer for directing air into said pipe, whereby said air may be forced into the casing connected with said top, a pair of rods connected with each side of said bottom, guiding lugs arranged on said top, said guiding lugs being formed with apertures through which said rods extend, means connected with the upper end of said rods for connecting the rods with one spring of an automobile, and means connected with said guides for connecting the guides with another spring of the automobile, said guides being rigidly connected with said top.

5. In a pneumatic cushioning device of the character described, a bottom, a tubular member extending from said bottom, a top, a tubular member extending from said top and telescopically fitting within the first mentioned tubular member, a pipe rigidly connected with said bottom and extending upwardly toward said top, said pipe being open at the bottom and provided with an aperture adjacent the bottom, means for permitting fluid to pass into said pipe through said opening and preventing fluid from passing said pipe to said opening, an air guiding tube extending into said pipe, a flexible washer connected with said tube, said washer permitting fluid to pass upwardly to the opening in said tube and preventing fluid from passing in the opposite direction, a piston structure connected with said pipe, said piston structure including a bearing and guiding member, a flexible washer and a clamping member for holding the washer in place, said washer preventing fluid from passing from the casing connected with said top when the piston is moving toward said top, means for connecting said bottom with one spring of an automobile, and means for connecting said top with another spring of said automobile.

6. In an automatic cushion of the character described, a bottom, a top, tubular members extending from said bottom and top respectively, said tubular members telescoping, a member connected with said bottom and extending toward said top, a piston connected with said last mentioned member, said piston being provided with a bearing member, a flexible washer and a clamping member for clamping the washer against the bearing member, an oil filling arranged above said piston and within the tubular casing extending from said top, means for directing air into the casing connected with said top, means for connecting said bottom with one spring of an automobile, and means for connecting said top with a second spring of said automobile.

In testimony whereof I have signed my name to this specification in the presence of two subscribing witnesses.

IRVING A. LAKE.

Witnesses:
A. L. KITCHIN,
PHILIP D. ROADHAUS.